United States Patent
Giacomino

(12) 
(10) Patent No.: US 6,591,737 B2
(45) Date of Patent: Jul. 15, 2003

(54) PAD PLUNGER ASSEMBLY WITH INTERFITTING KEYS AND KEY WAYS ON MANDREL AND PADS

(76) Inventor: Jeff Giacomino, 1762 Denver Ave., Ft. Lupton, CO (US) 80621

( * ) Notice: Subject to any disclaimer, the term of this patent is extended or adjusted under 35 U.S.C. 154(b) by 0 days.

(21) Appl. No.: 09/944,350

(22) Filed: Aug. 30, 2001

(65) Prior Publication Data

US 2002/0035919 A1 Mar. 28, 2002

Related U.S. Application Data

(60) Provisional application No. 60/235,996, filed on Sep. 27, 2000.

(51) Int. Cl.⁷ ................................................. F16J 1/06
(52) U.S. Cl. ......................................... 92/193; 417/59
(58) Field of Search ........................ 92/247, 192, 193; 417/59

(56) References Cited

U.S. PATENT DOCUMENTS

| | | | | |
|---|---|---|---|---|
| 1,784,899 A | * | 12/1930 | Imerman | 92/247 |
| 3,181,470 A | | 5/1965 | Clingman | |
| 3,424,066 A | * | 1/1969 | Moore | 192/193 |
| 4,030,858 A | * | 6/1977 | Coles, Jr. | 417/56 |
| 4,531,891 A | | 7/1985 | Coles, III | 417/59 |
| 4,803,922 A | | 2/1989 | Dennesen | |
| 4,898,235 A | * | 2/1990 | Enright | 417/57 |
| 5,366,324 A | | 11/1994 | Arlt et al. | |
| 5,427,504 A | | 6/1995 | Dinning et al. | 417/59 |
| 5,431,229 A | | 7/1995 | Christensen | |
| 5,462,115 A | | 10/1995 | Belden et al. | |
| 5,658,095 A | | 8/1997 | Arlt et al. | |
| 5,868,554 A | | 2/1999 | Giacomino et al. | |
| 6,045,335 A | | 4/2000 | Dinning | 417/59 |

* cited by examiner

*Primary Examiner*—F. Daniel Lopez
(74) *Attorney, Agent, or Firm*—Flanagan & Flanagan; John R. Flanagan

(57) ABSTRACT

A pad plunger assembly includes an elongated mandrel having a pair of opposite ends, at least one pad subassembly disposed about the mandrel and extending between the opposite ends thereof, a plurality of annular key ways and annular keys respectively defined on the mandrel and the pad subassembly, the key ways and keys interfitting with one another so as to impede the ability of a fluid to flow along the mandrel beneath the pad subassembly and adjacent to the mandrel and from one to the other of the opposite ends of the mandrel, and elements for securing the pad subassembly on and around the mandrel.

4 Claims, 2 Drawing Sheets

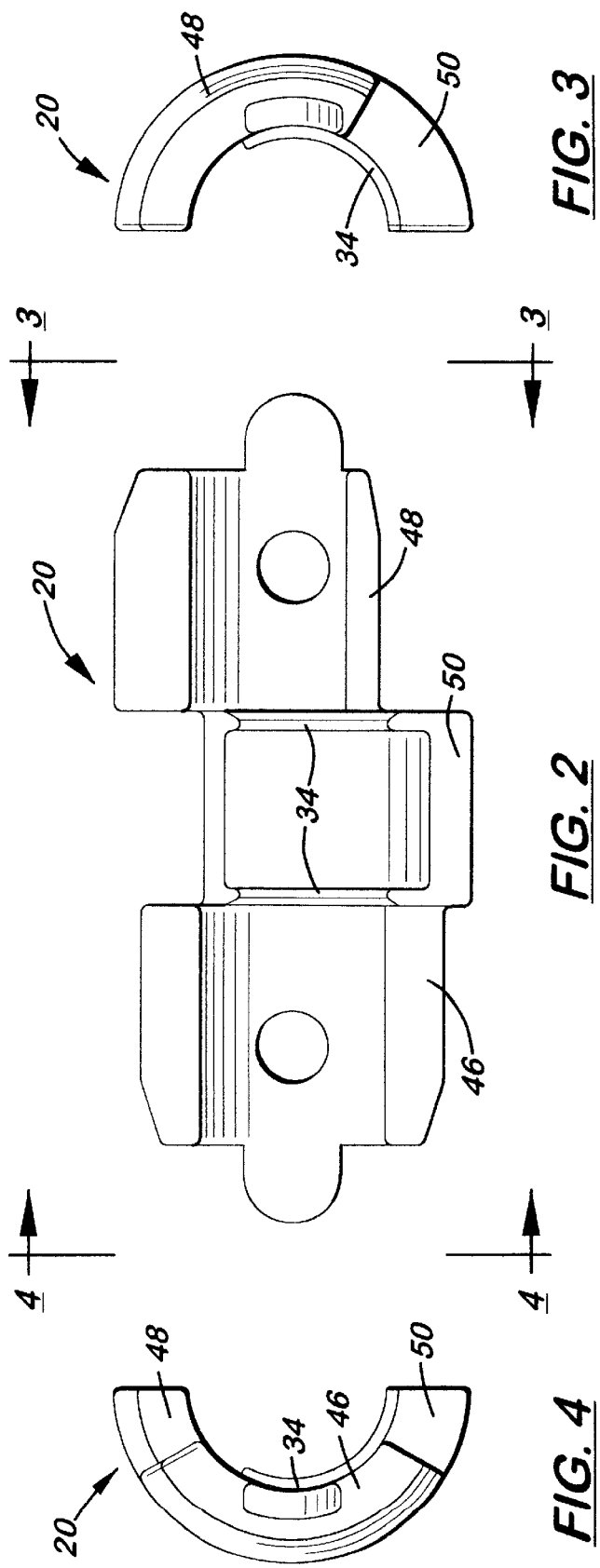

PAD PLUNGER ASSEMBLY WITH INTERFITTING KEYS AND KEY WAYS ON MANDREL AND PADS

This patent application claims the benefit of U.S. provisional application No. 60/235,996, filed Sep. 27, 2000.

BACKGROUND OF THE INVENTION

1. Field of the Invention

The present invention generally relates to a gas lift plunger assembly for use in a gas-producing well and, more particularly, is concerned with pad plunger assembly with interfitting keys and key ways on a mandrel and pads of the plunger assembly.

2. Description of the Prior Art

Gas-producing wells typically employ a plunger disposed within tubing of the well and capable of traveling vertically in the tubing as the well is cycled between shut-in and opened conditions in a manner well-known to one of ordinary skill in the art. The plunger is freely movable vertically in the well tubing and is adapted to rise vertically under the force of sufficient gas pressure to drive or lift the plunger and a slug of liquid, such as oil, above it to the surface while isolating the base of the liquid slug from the gas which lifts the plunger. The plunger falls by gravity back down the tubing of the well after the slug of liquid has been delivered to the surface and the gas pressure in the well tubing has decreased due to the transmission of gas from the well tubing to a suitable storage location.

One prior art plunger assembly, called a pad plunger assembly, has an elongated rigid non-flexible central rod or mandrel and a pair of end members attached to the opposite ends of the mandrel. Between the opposite ends of the mandrel, the plunger typically has one or more subassemblies of three spring-loaded interlocking pad sections thereon. The spring-loaded pad sections can expand outwardly from and contract inwardly toward the mandrel to compensate for any irregularities in the tubing thus creating a moving frictional seal with the well tubing.

A problem exists, however, with the above-described prior art plunger assembly. There is a tendency for oil and gas to flow beneath the pad sections along the mandrel such that the plunger assembly loses its sealing efficiency. Consequently, a need exists for an innovation in the construction of the pad plunger assembly which will provide a solution to the aforementioned problem without introducing any new problems in place thereof.

SUMMARY OF THE INVENTION

The present invention provides a pad plunger assembly designed to satisfy the aforementioned need. The plunger assembly of the present invention provides interfitting elements on the pad sections and mandrel of the assembly which impede the ability of oil and gas to flow along the mandrel beneath the pads from one end to the other end thereof. Such elements solve the aforementioned problem with the prior art plunger assembly design.

Accordingly, the present invention is directed to a pad plunger assembly which comprises: (a) an elongated mandrel having a pair of opposite ends; (b) at least one pad subassembly disposed about the mandrel between the opposite ends thereof; (c) a plurality of annular key ways and annular keys respectively defined on the mandrel and pad subassembly, the key ways and keys interfitting with one another so as to impede the ability of a fluid to flow along the mandrel and beneath the pad subassembly adjacent to the mandrel and from one to the other of the opposite ends of the mandrel; and (d) means for securing the pad subassembly on and around the mandrel.

More particularly, the annular key ways are annular grooves defined about and extending into an exterior surface of the mandrel. The annular keys are annular ridges defined on and protruding outwardly from pad sections of the pad subassembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is an enlarged side elevational view of one of a plurality of pads of the assembly of FIG. 1.

FIG. 3 is an end elevational view of the pad as seen along line 3—3 of FIG. 2.

FIG. 4 is an opposite end elevational view of the pad as seen along line 4—4 of FIG. 2.

DETAILED DESCRIPTION OF THE INVENTION

Figure 1:
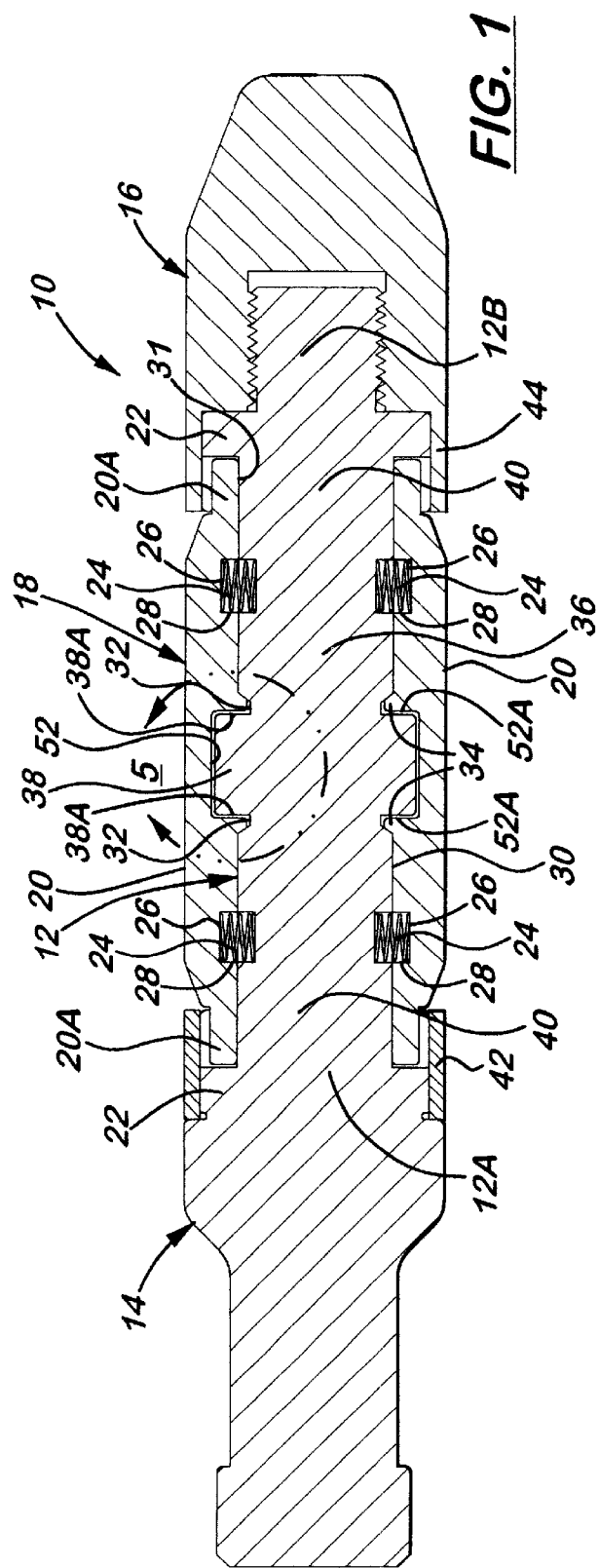
FIG. 1 is a longitudinal sectional view of a pad plunger assembly of the present invention.

Referring to the drawings and particularly to FIG. 1, there is illustrated, in a longitudinal sectional view, a pad plunger assembly, generally designated 10, of the present invention. In the illustrated embodiment, the pad plunger assembly 10 basically includes a non-flexible central rod or mandrel 12 and a pair of end members 14, 16 attached to the opposite ends 12A, 12B of the mandrel 12. The end members 14, 16 have larger diameters than the mandrel 12 and one end member 16 is threadably removable from mandrel 12. Between the opposite ends 12A, 12B of the mandrel 12, the plunger 10 has one subassembly 18 of three spring-loaded interlocking pad sections 20 which extend between annular collars 22 integrally formed on and extending around the mandrel 12 adjacent to the opposite ends 12A, 12B of the mandrel 12. The pad sections 20 are spring-loaded or biased by coil springs 24 disposed between and seated in recesses 26, 28 formed on each of the pad sections 20 and an outer surface 30 of the mandrel 12. While one pad subassembly 18 is illustrated, a plunger assembly can have more than one. The coil springs 24 cause the pad sections 20 of the pad subassembly 18 to expand outwardly from and permit them to contract inwardly toward the mandrel 12 to compensate for any irregularities in the tubing that the plunger assembly moves through thus creating a moving frictional seal with the well tubing. The above-described components of the pad plunger assembly 10 are the same as the components used in the prior art plunger design.

Figure 5:
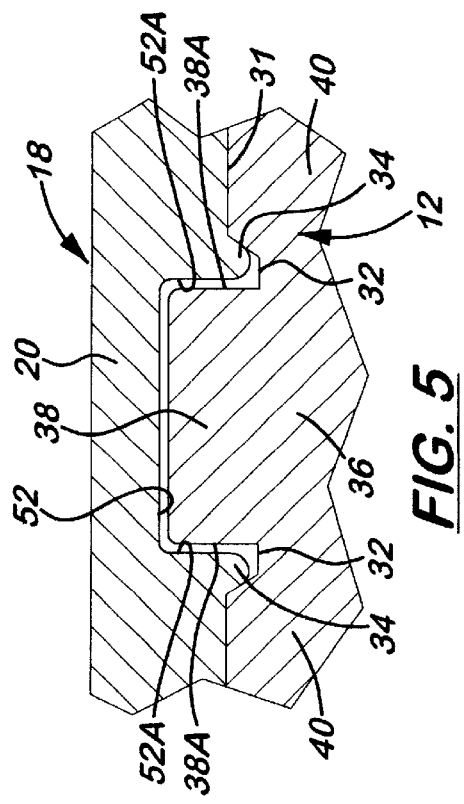
FIG. 5 is an enlarged detailed view of the portion of the assembly encompassed by circle 5 of FIG. 1.

In accordance with the present invention, the pad plunger assembly 10 further includes a plurality of annular recesses or key ways 32 and annular ridges or keys 34 respectively on the mandrel 12 and the pad sections 20 which interfit with one another, as shown in FIGS. 1 and 5, so as to impede the ability of fluid, such as oil and gas, to flow along the mandrel 12 beneath the pad sections 20 from one end 12A to the other end 12B of the mandrel 12. Such key ways 32 and keys 34 thus extend across and disrupt such fluid flow and thereby solve the aforementioned problem of seal efficiency of the prior art plunger design.

More particularly, the elongated mandrel 12 of the plunger assembly 10 includes an intermediate portion 36 disposed between the opposite ends 12A, 12B thereof. The outer surface 30 of the mandrel 12 extends between the opposite ends 12A, 12B and around the intermediate portion 36 thereof. The intermediate portion 36 has a central raised annular segment 38 and a pair of opposite side segments 40 extending in opposite directions from opposite sides 38A of the raised annular segment 38 toward the opposite ends 12A, 12B of the mandrel 12. The central raised annular segment 38 protrudes outwardly from the outer surface 30 at the intermediate portion 36 of the mandrel 12. The diameter of the central annular segment 38 is less than that of the opposite ends 12A, 12B of the mandrel 12 while the diameters of the side segments 40 are less than the diameter of the central raised annular segment 38. Also, the pad sections 20 of the pad subassembly 18 surround and overlie the outer surface 30 of the annular intermediate portion 36 of the mandrel 12 and have opposite ends 20A which extend and are captured under flanges 42, 44 of the opposite end members 14, 16. The pad sections 20 of the pad subassembly 18 also have inner surfaces 31 facing toward the outer surface 30 of the intermediate portion 36 of the mandrel 12.

The key ways 32 take the form of a pair of annular grooves axially spaced along the mandrel 12 and defined in the respective opposite side segments 40 adjacent to the opposite sides 38A of the central raised annular segment 38 such that the opposite sides 38A of the central annular segment 38 are substantially aligned with the annular grooves or key ways 32. The pad sections 20 each includes a pair of arcuate-shaped opposite end segments 46, 48 being circumferentially offset from each other, and an arcuate-shaped middle segment 50 disposed between, interconnecting and circumferentially offset from the opposite end segments 46, 48 and defining an interior recess 52 in the inner surface 31 of the middle segment 50 of the pad section 20 which receives the central raised annular segment 38 of the intermediate portion 36 of the mandrel 12. When the central raised segment 38 extends into the interior recess 52 of each pad section 20, a pair of axially-spaced opposite sides 52A of the recess 52 are disposed in a facing relationship to the opposite sides 38A of the central raised segment 38 50 as to disrupt a path of flow of fluid between the pad assemblies 18 and the mandrel 12 from one to the other of the opposite ends 12A, 12B of the mandrel 12. The keys 34 take the form of arcuate-shaped ridges on the middle segment 50 being defined along respective axially-spaced opposite sides 52A of the interior recess 52 and protruding inwardly from the inner surfaces 31 of the pad assemblies 18 and substantially aligned with the respective opposite sides 52A of the interior recess 52. The ridges or keys 34 have cross-sectional shapes complementary to cross-sectional shapes of the annular key ways or grooves 32 of the intermediate portion 36 of the mandrel 12 such that the arcuate-shaped keys or ridges 34 interfit into and interengage with the annular key ways or grooves 32 so as to further disrupt the path of flow of fluid between the pad sections 20 and the mandrel 12 from the lower end 12A to the upper end 12B of the mandrel 12 and thereby enhance the sealing capabilities of the assembly 10 with a hollow tubing of a gas-producing well. Also, as well-known in the prior art plunger assembly, there are means provided on the mandrel 12 and the pad sections 20 for releasably securing the pad sections 20 on the mandrel 12 at angularly spaced positions around the mandrel 12.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A pad plunger assembly, comprising:
   (a) an elongated mandrel having
      (i) a pair of opposite ends,
      (ii) an intermediate portion disposed between said opposite ends and having an outer surface extending around said intermediate portion and between said opposite ends,
      (iii) a central raised annular segment on said intermediate portion protruding outwardly from said outer surface thereof, and
      (iv) a pair of opposite side segments on said intermediate portion extending in opposite directions from opposite sides of said raised annular segment toward said opposite ends of said mandrel;
   (b) at least one pad subassembly disposed about said outer surface of said intermediate portion and extending between said opposite ends of said mandrel, said pad subassembly having
      (i) an inner surface facing toward said outer surface of said intermediate portion of said mandrel, and
      (ii) an annular interior recess defined in said inner surface and having a pair of axially-spaced opposite sides and a cross-sectional shape complementary to a cross-sectional shape of said central raised annular segment of said mandrel such that said central raised annular segment extends into said annular interior recess and said opposite sides of said central raised annular segment are disposed in a facing relationship to said opposite sides of said annular interior recess so as to disrupt a path of flow of fluid between said pad subassembly and mandrel from one to the other of said opposite ends of said mandrel and thereby enhance the sealing capabilities of said pad plunger assembly with a hollow tubing of a gas-producing well;
   (c) a pair of annular key ways defined on said mandrel and a pair of annular keys defined on said pad subassembly, said annular key ways being annular grooves axially spaced from one another along said intermediate portion of said mandrel and defined about said respective opposite side segments of said intermediate portion of said mandrel and extending from said outer surface thereof into said opposite side segments adjacent to said opposite sides of said central raised annular segment such that said opposite sides of said central raised annular segment are substantially aligned with said annular grooves, said annular keys being arcuate-shaped annular ridges respectively protruding inwardly from said inner surface of said pad subassembly and substantially aligned with said respective opposite sides of said interior recess of said pad subassembly and having cross-sectional shapes complementary to cross-sectional shapes of said annular grooves of said mandrel such that said arcuate-shaped ridges interfit with said annular grooves so as to further disrupt the path of flow of fluid between said pad subassembly and mandrel from one to the other of said opposite ends of said mandrel and thereby further enhance sealing capabilities of said pad plunger assembly with a hollow tubing of a gas-producing well; and (d) means for securing said pad subassembly on and around said mandrel.

2. A pad plunger assembly, comprising:

(a) an elongated mandrel having a pair of opposite ends;

(b) at least one pad subassembly disposed about said mandrel and extending between said opposite ends thereof, said pad subassembly having a plurality of pad sections, each of said pad sections including
  (i) a pair of arcuate-shaped opposite end segments being circumferentially offset from each other, and
  (ii) an arcuate-shaped middle segment disposed between, interconnecting and circumferentially offset from the opposite end segments and defining an interior recess which receives a central raised annular segment of an intermediate portion of the mandrel;

(c) a plurality of annular key ways and annular keys respectively defined on said mandrel and said pad subassembly, said key ways and keys interfitting with one another so as to impede the ability of a fluid to flow along said mandrel and beneath said pad subassembly adjacent to said mandrel and from one to the other of said opposite ends of said mandrel; and (d) means for securing said pad subassembly on and around said mandrel.

3. The assembly of claim 1 wherein said key ways are annular grooves defined in an outer surface of said opposite side segments of said intermediate portion of said mandrel at opposite sides of said central raised annular segment thereof.

4. The assembly of claim 3 wherein said keys are arcuate-shaped ridges defined along respective axially-spaced opposite sides of said interior recess of said middle segment of said each pad section and having cross-sectional shapes complementary to cross-sectional shapes of said annular grooves of said intermediate portion of said mandrel which arcuate-shaped ridges interengage with said annular grooves so as to disrupt a path of flow of gas between said pad sections and said mandrel from one to the other of said opposite ends of said mandrel and thereby enhance the sealing capabilities of said assembly with a hollow tubing of a gas-producing well.

* * * * *